United States Patent

Schieser

[15] 3,665,111

[45] May 23, 1972

[54] TELEPHONE USE MONITOR AND SIGNALLING APPARATUS

[72] Inventor: Warren J. Schieser, 483 Westmore Rd., Columbus, Ohio 43214

[22] Filed: Aug. 13, 1970

[21] Appl. No.: 63,397

[52] U.S. Cl. ..............................179/81 C, 250/215, 340/228

[51] Int. Cl. ..........................................................H04m 1/22

[58] Field of Search..................250/215; 179/81 C, 84 L, 51; 340/220, 228, 251

[56] References Cited

UNITED STATES PATENTS

| | | | |
|---|---|---|---|
| 2,780,676 | 2/1957 | Berch | 179/51 R |
| 2,461,241 | 2/1949 | Shann | 179/84 L |

OTHER PUBLICATIONS

Howell, " Light Activated Switch Expands Uses of Silicon-Controlled Rectifiers," 5/4/64, Electronics, p. 53–54.

*Primary Examiner*—Kathleen H. Claffy
*Assistant Examiner*—William A. Helvestine
*Attorney*—Mahoney, Miller & Stebens

[57] ABSTRACT

A monitor and signalling apparatus for a telephone set having illuminable line-selector buttons or indicator lights, or a switchboard equipped with indicator lights. The apparatus includes an electrical circuit and signalling mechanism independent of a telephone set and having photo-responsive cell for responding to illumination of a line-selector button for a specific line. Absence of illumination results in activation of the signalling mechanism thereby advising of that line's availability for use.

12 Claims, 12 Drawing Figures

INVENTOR.
WARREN J. SCHIESER
BY
MAHONEY, MILLER & STEBENS
BY Wm. V. Miller
ATTORNEYS

INVENTOR.
WARREN J. SCHIESER

BY
MAHONEY, MILLER & STEBENS
BY [signature]
ATTORNEYS

INVENTOR
WARREN J. SCHIESER
BY
MAHONEY, MILLER & STEBENS
BY [signature]
ATTORNEYS

INVENTOR.
WARREN J. SCHIESER

BY
MAHONEY, MILLER & STEBENS
BY
ATTORNEYS

TELEPHONE USE MONITOR AND SIGNALLING APPARATUS

BACKGROUND OF THE INVENTION

The monitor and signalling apparatus of this invention finds particular application with subscriber's telephone systems having a direct-line connection with a relatively remote geographical location such as would normally entail use of a telephone company's long distance equipment. With the direct-line system, commonly referred to as WATS, a telephone-set which may be connected to this system is also generally connected with additional local lines and is provided with line-selector buttons that are illuminated when a respective line is in use. The WATS line is subjected to a high degree of use in most installations since there are several people, each with their own telephone-set, that utilize a single WATS line and the nature of the business generally requires substantial telephone communication. Consequently, a person desiring to use the WATS line often finds that the line is already in use and, in an effort to obtain the line, frequently spends a considerable amount of time merely watching the telephone-set to ascertain when the WATS line selector button light is not illuminated thereby indicating that the line is available for use. This also results in the WATS line not being utilized to its fullest capacity as, normally, a person will not stop all activity merely to watch the telephone and will be otherwise occupied when the WATS line is available. As an economical factor, watching the telephone for availability is a waste of time that could otherwise be productive and the WATS line not utilized to capacity also represents an economical waste since the charge is not based on number of calls. The latter is particularly a waste when urgent calls must be made through normal long distance equipment thus entailing an additional charge. This problem is not limited to long-distance circuits and is frequently encountered with local telephone circuit systems.

BRIEF DESCRIPTION OF THE INVENTION

The illustrated embodiment of a monitor and signalling apparatus of this invention comprises an electrical control circuit having a photo-responsive cell positionable in light coupled relationship to an illuminable line-selector button or illuminable line-indicator of a telephone and a signalling mechanism actuated in response to the state of illumination of the line selector button. With the circuit energized and the photo-responsive cell coupled with a selector button or indicator light of the telephone, the availability of that particular line will be advised as a result of the button or light ceasing to be illuminated resulting in actuation of the signalling mechanism. Provision may be made in the electrical circuit to selectively energize the circuit only at those times during which a person may desire to obtain use of that particular line. In addition to a manually operated circuit-energizing switch, the circuit may be provided with timing means for automatically energizing the circuit at predetermined times. Providing a signal indicating availability of the particular line by the apparatus of this invention thus saves time in eliminating personal monitoring of the telephone to ascertain availability of the line and greatly enhances the economy of use of a telephone system of the WATS type.

These and other objectives and advantages of this invention will be readily apparent from the following detailed description of several embodiments thereof and the accompanying drawings.

DETAILED DESCRIPTION OF THE INVENTION

Figure 1:
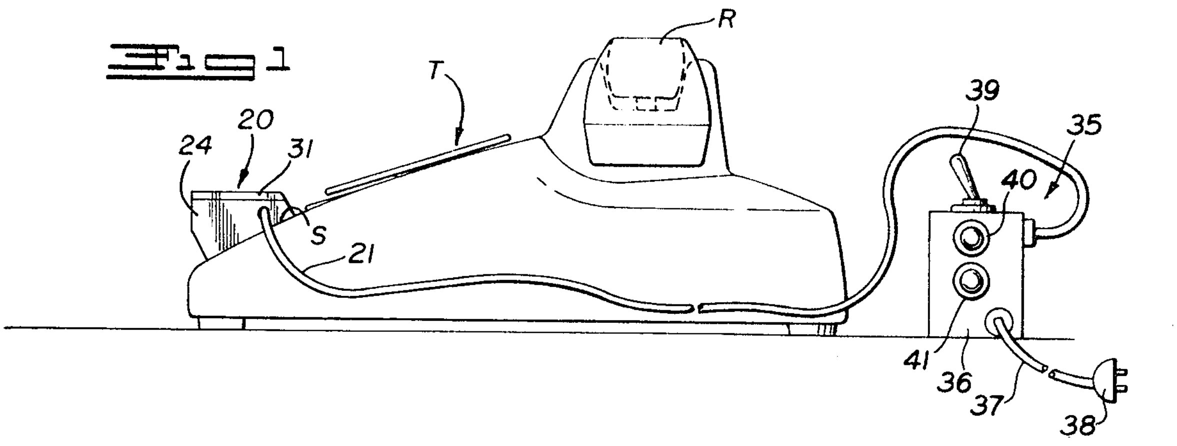
FIG. 1 is a side elevational view of a telephone set having the use-detector portion of an embodiment of this in-vention associated therewith.
Figure 3:
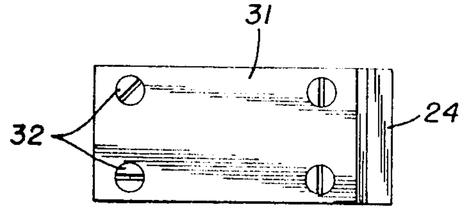
FIG. 3 is a top plan view of the use detector taken along a horizontal plane passing through line 3—3 of FIG. 2.
Figure 2:
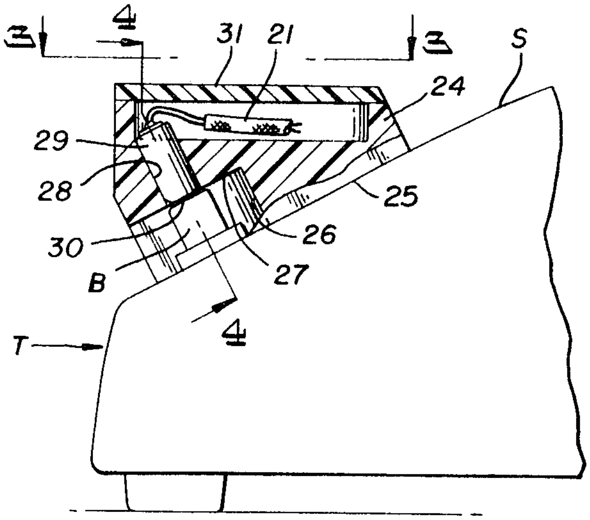
FIG. 2 is a fragmentary side elevational view on an enlarged scale, of the telephone set of FIG. 1 with portions of the use-detector broken away.
Figure 4:
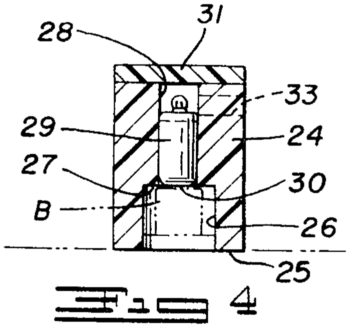
FIG. 4 is a vertical, transverse sectional view of the use-detector taken along line 4—4 of FIG. 2.

Having specific reference to FIGS. 1–4 of the drawings, an embodiment of a telephone-use responsive means 20 of the photo-responsive type is shown positioned in operatively coupled relationship to a particular line-selector button B of a conventional telephone set T. In the usual telephone installation having two or more telephone circuit lines, a corresponding number of line-selector buttons are provided such as the illustrated button B in FIG. 2 associated with the particular circuit that for the purposes of this description is designated as a WATS line or other similar function line. An electrical cable 21 carrying the two conductors 22, 23 extends from the use responsive means 20 for interconnection with an electrical control circuit schematically shown in FIG. 11.

Comprising the use responsive means 20 shown in FIGS. 1–4 is a housing 24 formed from an opaque material, preferably a thermosetting synthetic resin, with a base surface 25 adapted to rest on the upper inclined surface S. The housing 24 is of a size to fully encompass a line-selector button B but not so large as to interfere with adjacent buttons and is of a configuration to rest in a stable position on the telephone set. Formed in the housing 24 is a recess 26 having a surface 27 spaced from the base surface 25 a distance substantially equal to the height of the selector button B. A cavity 28 is also formed in the housing to receive and support a photo-responsive device 29 in optically coupled relationship to the line-selector button. In this embodiment, the photo-responsive device 28 is a photo-electric cell of elongated cylindrical configuration having a receptor surface 30. In the absence of a specific magnitude of light incident to the receptor surface, the cell has a relatively high resistance and is essentially non-conductive but changes to a relatively low-resistance and becomes electrically conductive when the incident light exceeds this value. The cavity 28 is formed in the housing 24 to support the photo-responsive device 29 in coaxial alignment with the line-selector button B with the receptor surface 30 disposed in the plane of the surface 27 closely adjacent the end surface of the line selector button for optimum response to illumination from the button but minimum response to ambient illumination that may enter the recess 26. A removable cover plate 31 is secured by screws 32 to the upper portion of the housing 24 to provide access to the conductors 22, 23 connected to the photo-responsive device 29 and exit through an opening 33 formed in the side wall of the housing.

The electrical cable 21 extends from the telephone-use responsive means 20 to a control unit 35 (see FIG. 1) that is preferably disposed at a position convenient for the telephone user. Included in the control unit 35 which comprises a structural case 36 are the circuit components illustrated in the schematic diagram of the electrical circuit (FIG. 11) except the photo-responsive device 29. Electrical power for operation of the apparatus is obtained by means of a cable 37 and connector 38 adapted for connection to the usual 120 volt AC receptacles. A manually operated two-position toggle switch 39 is mounted on the structural case 36 as are the optional line in use light 40 and optional time allocation light 41. Also included in the control unit 35 is an aural-type signalling mechanism 42 such as an electrically actuated buzzer. The lights 40, 41 and buzzer 42 are connected in a power circuit that may also include a time-switch motor 43 and the primary winding of a transformer 44 having two secondary windings to isolate the commercial power source and to provide voltages for the solid state control circuit which includes the photo-responsive device 29. A circuit protective fuse 45 is inserted in the power circuit.

Energization and actuation of the signalling mechanism 42 is effected through an electromagnetic relay having an operating coil CR connected in the control circuit and a normally open set of contacts CR1 connected in series circuit with the signalling mechanism across the power circuit conductors 46 and 47. The relay coil CR is connected in a switching circuit that includes a power transistor T1, current limiting resistor R1, diode D1 and the low voltage (10 volt) secondary winding of the transformer 44. A capacitor C1 is connected to a common ground conductor of the transformer windings as a filter for the low voltage power supply. Switching of the power switching transistor T1 is effected by a driver circuit including the transistor T2 having its collector connected at the juncture of the two resistors R2 and R3 in the collector-base junction biasing circuit for transistor T1. The emitter of the driver transistor T2 is connected to the common terminal of the low voltage transformer secondary winding as is the emitter of the power transistor T1. A common emitter-base biasing circuit is provided for transistors T1 and T2 with this circuit connected to the low voltage transformer secondary winding through a diode D2, current limiting resistor R7 and the voltage-divider network comprising resistors R8 and R9 with a filter capacitor C2 connected across the two series connected resistors. Respective resistors R4 and R6 interconnect the bases of transistors T1 and T2 with the voltage divider network.

A high voltage transformer secondary winding (100 volts) in combination with a rectifier diode D3 and current limiting resistance R10 provides DC power to the photo-responsive device 29. Filtering is provided by a capacitor C3 and resistor R11. The photo-responsive device 29 functioning as a light-responsive switch series-connected with a resistor R5 connects the base of driver transistor T2 to this biasing circuit whenever a sufficient amount of light is incident to the receptor surface 30 of photo-responsive device 29, such as is the case when the line selector button B is illuminated indicating that the respective telephone circuit is in use. With the collector-base junction of driver transistor T2 thus forward biased, this transistor is conductive and will result in reverse biasing of the power transistor T1 which will remain cut-off and in a non-conductive state. Without the required degree of illumination incident to the receptor surface 30, such as when the line-selector button B is not illuminated indicating that the line is not in use, the photo-responsive device 29 will be highly resistive and relatively non-conductive and result in reverse biasing of the collector-base junction of transistor T2 which will be cut-off and non-conductive. This results in forward biasing of the power transistor T1 and switching of that transistor to an ON or conductive state and consequent energization of the relay coil CR. Energization of the relay coil CR causes the normally open contacts CR1 to close completing an electrical circuit to the signalling mechanisms 42 thereby providing an aural signal advising of the non-use of that particular telephone circuit. Subsequent illumination of the line-selector button B would again return the power transistor T1 to an OFF or non-conductive state as previously described.

The toggle switch 39 is inserted in the signalling mechanism circuit to enable the telephone user to disable this mechanism while using the telephone on either this particular circuit or any other circuit. Also, switch 39 would be placed in the open circuit configuration when it is not desired to be advised of non-use of the particular telephone circuit and it will be understood that this switch would be closed in the preceeding discussion of the circuit operation. The line-in-use light 40 is desirable since the housing 24 of the telephone-use responsive means 20 substantially enclosed the line-selector button and prevents visual observation of the operating status of the apparatus. This light 40 is series connected with a normally closed set of contacts CR2 of the relay switch across the power circuit conductors 46 and 47 and will be illuminated whenever the telephone circuits in use and the associated line selector button B is illuminated. Energization of relay coil CR in response to the line-selector button B not being illuminated results in opening of contacts CR2 and light 40 will also not be illuminated.

In certain telephone installations, the usage of a particular telephone circuit of this type must be shared by two or more groups of telephone users and it is desirable that the apparatus also be capable of automatically enabling operation of the signalling mechanism 42 for predetermined time intervals of a selected time base. For this purpose, the illustrated embodiment is also provided with a timer-switch 48 having the timer motor 43. The timer switch 48 is connected in series with the signalling mechanism 42 and relay contacts CR1 and, when open, prevents energization of the signalling mechanism in response to normal operation of the control circuit. The timer motor 43 is connected across the power circuit conductors 46 and 47 and is continuously operated when the apparatus is connected to a suitable power source. Mechanically coupled with and driven by the timer motor 43 is a cam 49 that is designed to cyclically actuate the switch 48. This cyclic actuation would normally be a specified portion of each hour. For additional operator convenience, the time allocation light 41 is provided and is connected in series with the timer switch 48 and will be illuminated whenever the switch is closed thereby enabling normal operation of the apparatus.

The apparatus thus described provides automatic advisement of the availability of the particular telephone Circuit; however, it is necessary to lift the hand-held receiver transmitter R to secure the circuit at the specific telephone-set T. If the receiver transmitter R is not lifted, the circuit may be secured at another telephone set resulting in automatic deactivation of the signalling mechanism. Automatic securing of the circuit is accomplished in the embodiment shown in FIG. 12 by a solenoid-actuated lever mechanism 50 which is positioned in co-operative relationship to the telephone set T. A lever arm 51 pivoted at 52 to a supporting bracket 53 projects under the receiver-transmitter R as shown in FIG. 1. Pivoting of the lever arm 51 in a clockwise direction, as viewed in FIG. 12, lifts the receiver-transmitter R to secure the telephone circuit at this particular telephone set T. An electrical solenoid 54 mounted on the bracket 53 and having an armature 55 connected to the lever ar m 51 by the linkage 56 accomplishes pivoting of the lever arm. The solenoid 54 is connected across the power circuit conductors 46 and 47 through a normally open set of contacts CR3 actuated by the relay coil CR and a second set of contacts **39*a* associated with the toggle switch 39. Energization of the relay coil CR in the normal operation sequence for activation of the signalling mechanism, assuming that the toggle switch 39 has been placed in the ON position, also closes contacts CR3 and energizes solenoid 54 which then lifts the receiver-transmitter R and secures the telephone circuit. This results in illumination of the line-selector button B and deenergization of the relay coil CR permitting the contacts CR3 to open. A by-pass circuit comprising a normally open limit-switch contact 57 is connected across the relay contacts CR3 and maintains the solenoid 54 in an energized state until the telephone user operates the switch 39 to deactivate the signalling mechanism as previously described. The limit-switch 57 is mounted on the bracket 53 adjacent the solenoid 54 to be actuated by the armature 55 when the solenoid is energized. Although shown combined into a single unit, the switch contacts 39***a* may be in a separate unit and operable independently of the contacts 39. This separate arrangement would permit optional operation of the automatic line securing mechanism.

Figure 11:
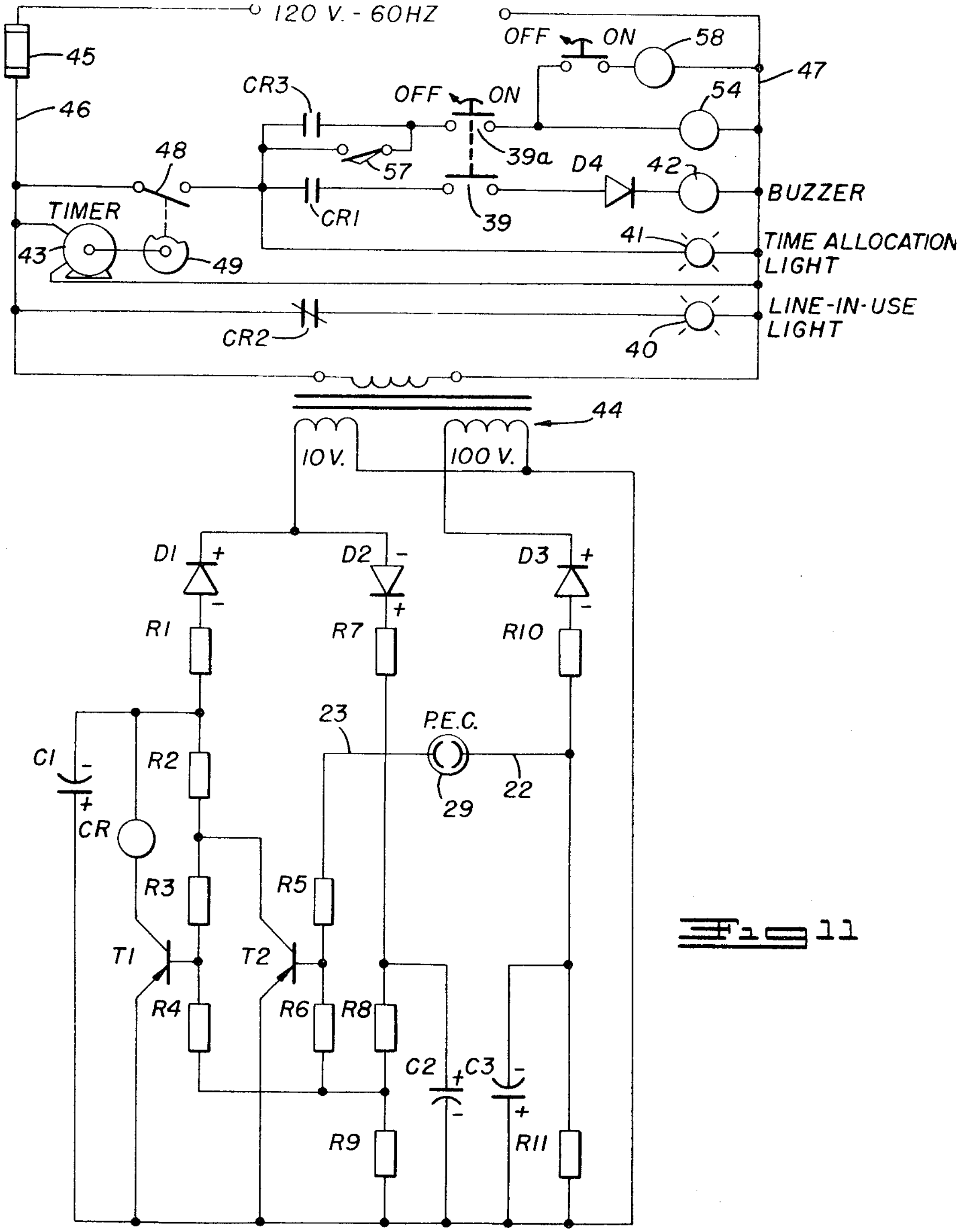
FIG. 11 is a schematic diagram of the electrical circuit for the telephone-use monitor and signalling apparatus.
Figure 12:
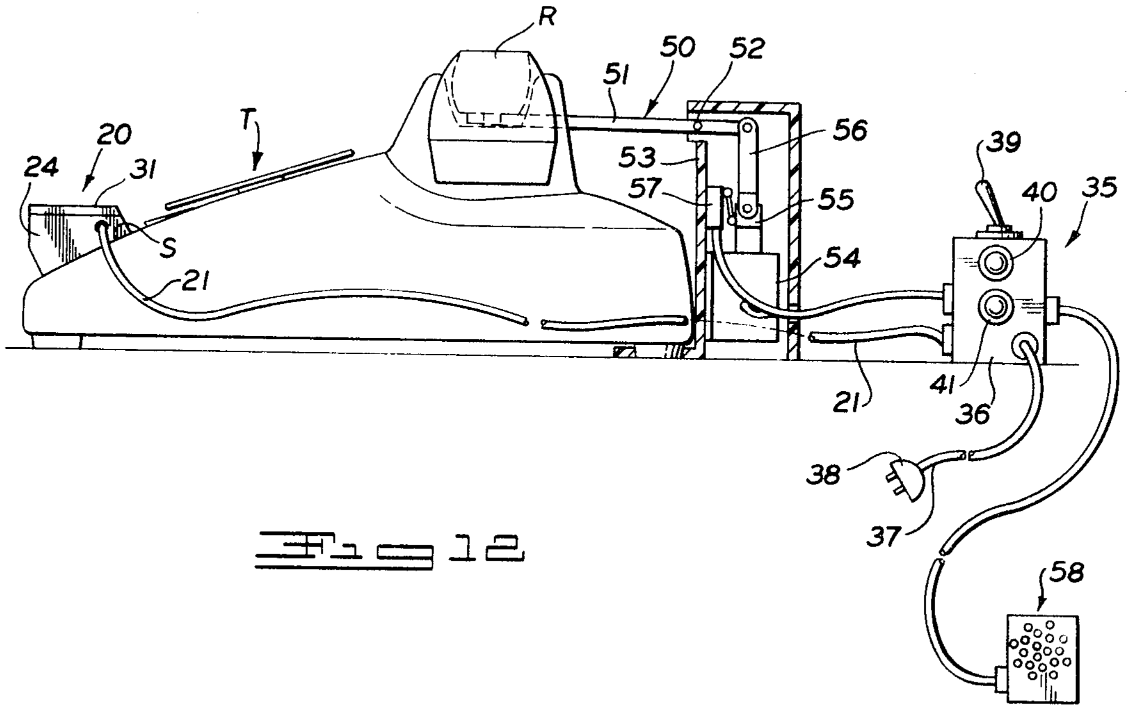
FIG. 12 is a side elevational view of a telephone set provided with a modified embodiment of a use monitoring and signalling apparatus of this invention.

In the apparatus as presently described, availability of the line is indicated by aural signalling mechanism or buzzer 42 which is positioned at or near the telephone set T. This arrangement normally requires that the prospective user remain in relatively close proximity to the telephone set and this may be an inconvenient restriction for those having normal activities that include relatively remote locations. For convenience of such persons, the apparatus may also include a selectively operable, auxiliary signalling mechanism 58 that may be located at a relatively remote location as shown in FIG. 12. This signalling mechanism may be an aural or visual type, buzzer or light, as desired for a specific installation and is preferably interconnected in the circuit so as to be energized only when the solenoid 54 for lifting the receiver-transmitter R has been energized and has secured the line. This preferred electrical connection is shown in FIG. 11 and also includes a manual switch 59 connected in series across the solenoid 54 permitting selective operation. The signalling mechanism 58 is shown enclosed in a suitable housing at a location remote to the telephone set T in FIG. 1.

Figure 5:
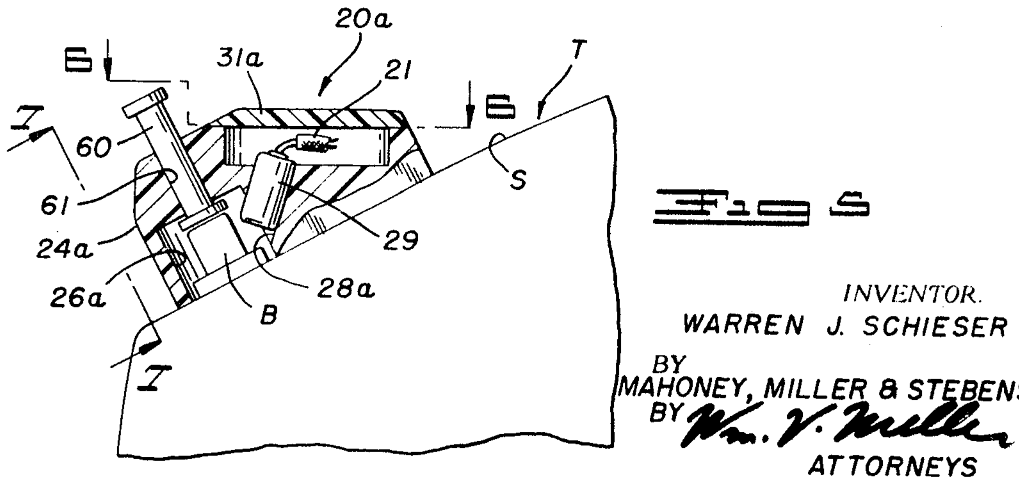
FIG. 5 is a fragmentary side elevational view of a telephone set similar to FIG. 2 but provided with a use-detector of modified construction.
Figure 6:
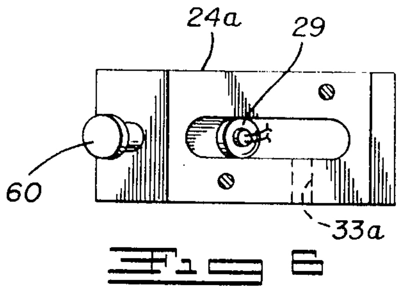
FIG. 6 is a horizontal sectional view of the use detector taken along line 6—6 of FIG. 5.
Figure 7:
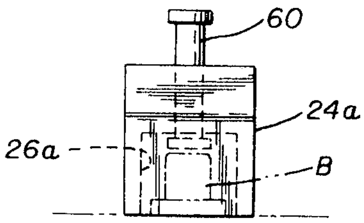
FIG. 7 is an end elevational view of the use-detector taken along a plane passing through line 7—7 of FIG. 5.

FIGS. 5, 6 and 7 illustrate a modified telephone-use responsive means 20*a* designed for use at locations having a relatively high degree of ambient illuminating such as would adversely affect operation of the use responsive means 20 that has been previously described. The modified means 20*a* which is the preferred form also comprises a housing 24*a* of substantially the same configuration with a removable cover plate 31*a*, an opening 33*a* where the cable 21 connecting with a photo-responsive device 29 exits the housing, a cavity 28*a* for receipt and support of the photo-responsive device and a recess 26*a* for receiving the line-selector button B. The recess 26*a* totally encloses the line-selector button B and the cavity 28*a* is oriented to support the photo-responsive device in angular relationship to the line-selector button. An elongated plunger 60 with enlarged end portions slideably disposed for axial displacement in a bearing guide 61 formed in the housing wall is supported in coaxial alignment with the line-selector button B and, when pushed downwardly, actuates the line-selector button to connect the telephone-set T into that telephone circuit.

Figure 9:
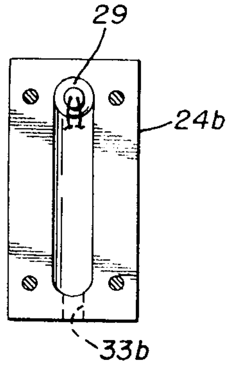
FIG. 9 is a vertical sectional view of the use-detector taken along line 9—9 of FIG. 8.
Figure 8:
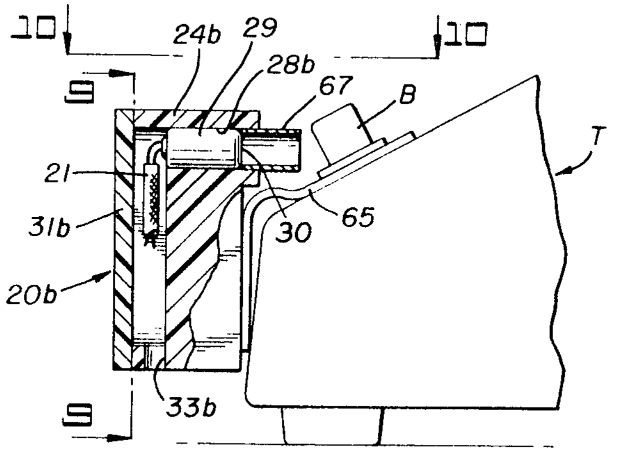
FIG. 8 is a fragmentary side elevational view of a telephone set similar to FIG. 2 but provided with a use-detector of further modified construction.
Figure 10:
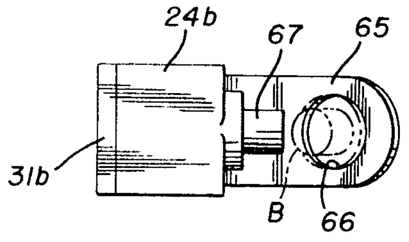
FIG. 10 is a top plan view of the use-detector taken along line 10—10 of FIG. 8.

A second modified form of telephone-use responsive means 20*b* is illustrated in FIGS. 8, 9 and 10 and is designed for utilization where ambient light is of a relatively low magnitude. This structure comprises a housing 24*b* of generally rectangular configuration having a mounting bracket 65 secured thereto for attachment to the telephone-set T through extension of the line-selector button B through an aperture 66 formed in the terminal end of the bracket. The housing 24*b* will thus be supported at the front of the telephone-set T and will not interfere with normal operation and observation of the line-selector buttons. A cavity 28b for receipt and support of a photo-responsive device 29 with the cavity horizontally disposed and opening at a vertical side of the housing adjacent to and in alignment with the line-selector button B. A cylindrical tube 67 may be inserted in the cavity and in alignment therewith to restrict and further limit incidence of ambient illumination at the receptor surface 30 of the photo-responsive device. The housing 24*b* also includes a removable cover plate 31*b* and opening 33*b* for exit of the cable 21 connecting with the photo-responsive device 29.

While the apparatus has been described as being of a type responsive to illumination or non-illumination of a line-selector button B of a telephone-set T, it will be understood that the signalling light may be on a telephone switch board or telephone receptionest telephone-set. This arrangement would permit a switch-board operator to be advised of the availability of a line and enable the operator to secure the line at the earliest opportunity for anyone of several interconnected telephone-sets.

It will be readily apparent that a novel monitor and signalling apparatus is provided for a telephone-set with the apparatus capable of automatically sensing the non-use condition of a selected telephone circuit. Signalling is effected by an aural mechanism thereby relieving the prospective telephone user of the task of visually monitoring the telephone set as is the case with the prior art telephone apparatus.

Having thus described this invention, what is claimed is:

1. A telephone-use monitor and signalling apparatus comprising

A. an electrical control circuit having output means and provided with telephone-use responsive means interconnected in circuit therewith and being positionable in operatively coupled relationship to a telephone, said circuit responding to non-use of the telephone as sensed by said use responsive means to cause said output means to form an output signal, B. a signalling mechanism selectively operable to provide an aural signal coupled with said control circuit to receive a signal formed by said output means, said signalling mechanism responding to a received output signal to provide an aural signal, and C. telephone circuit securing means comprising a lever mechanism positionable in mechanically coupled relationship to the receiver-transmitter of the telephone and an electric solenoid mechanically coupled with said lever mechanism and operable when energized to actuate said lever mechanism in lifting the receiver-transmitter to secure the circuit, said control circuit output means connected in circuit with said solenoid for energization thereof in response to sensing of non-use of the telephone.

2. Apparatus according to claim 1 including a second, electrically energizable signalling mechanism positioned relatively remote to the telephone, said second signalling mechanism connected in shunt relationship to said solenoid for energization simultaneously therewith.

3. A telephone-use monitor and signalling apparatus comprising

A. an electrical control circuit having output means and provided with telephone-use responsive means interconnected in circuit therewith and being positionable in operatively coupled relationship to a telephone, said telephone-use responsive means comprising a housing of opaque material having a base surface adapted to rest on a surface of the telephone in overlying relationship to a line-selector button thereof and having a recess formed therein to receive the line-selector button, a cavity formed in said housing and a photo-responsive device disposed in said cavity to be in optically coupled relationship to a line-selector button projecting into said recess, said circuit responding to non-use of the telephone as sensed by said use responsive means to cause said output means to form an output signal, and B. a signalling mechanism selectively operable to provide an aural signal coupled with said control circuit to receive a signal formed by said output means, said signalling mechanism responding to a received output signal to provide an aural signal.

4. Apparatus according to claim 3 wherein said telephone-use responsive means includes a photo-responsive device positionable in optically coupled relationship to an illuminable line indicator of the telephone.

5. Apparatus according to claim 3 wherein said control circuit output means includes switch means connected in series circuit with said signalling mechanism, said switch means operating in response to sensing of non-use of the telephone circuit to permit actuation of said signalling mechanism.

6. Apparatus according to claim 3 wherein said switch means includes an electromagnetic relay having an operating coil connected in said control circuit and a set of contacts connected in series circuit with said signalling mechanism, said operating coil being energized in response to sensing of non-use of the telephone to operate said contacts to permit actuation of said signalling mechanism.

7. Apparatus according to claim 3 which includes time-controlled switch means series connected with said switch means and said signalling mechanism, said time-controlled switch means operable to complete an electrical circuit to said signalling mechanism for only a predetermined time interval of a selected time base.

8. Apparatus according to claim 3 wherein said housing is provided with an elongated plunger supported for axial movement in coaxial relationship to a line-selector button received within said recess to permit actuation of the line-selector button through manipulation of said plunger.

9. Apparatus according to claim 3 wherein said recess only opens at said base surface of said housing.

10. Apparatus according to claim 3 wherein said recess is formed with a surface which is in close proximate relationship to a surface of a line-selector button received with said recess, said cavity opening at said recess surface to limit incidence of ambient light at said photo-responsive device.

11. A telephone-use monitor and signalling apparatus comprising

A. an electrical control circuit having output means and provided with telephone-use responsive means interconnected in circuit therewith and being positionable in operatively coupled relationship to a telephone, said telephone-use responsive means comprising a housing of opaque material having a bracket secured thereto for attaching said housing to the telephone, a cavity formed in said housing and a photo-responsive device disposed in said cavity to be in optically coupled relationship to a line-selector button when said housing is attached to a telephone, said circuit responding to non-use of the telephone as sensed by said use responsive means to cause said output means to form an output signal, and B. a signalling mechanism selectively operable to provide an aural signal coupled with said control circuit to receive a signal formed by said output means, said signalling mechanism responding to a received output signal to provide an aural signal.

12. Apparatus according to claim 11 wherein said photo-responsive device has a receptor surface that is disposed a substantial distance inwardly of an outer terminal end of said cavity to limit incidence of ambient light at said receptor surface.

* * * * *